United States Patent
Wu et al.

(10) Patent No.: US 7,000,101 B2
(45) Date of Patent: Feb. 14, 2006

(54) SYSTEM AND METHOD FOR UPDATING BIOS FOR A MULTIPLE-NODE COMPUTER SYSTEM

(75) Inventors: Frank L. Wu, Austin, TX (US); Fang Lu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 536 days.

(21) Appl. No.: 10/027,833

(22) Filed: Dec. 21, 2001

(65) Prior Publication Data

US 2003/0120913 A1    Jun. 26, 2003

(51) Int. Cl.
*G06F 9/445* (2006.01)
*G06F 9/24* (2006.01)

(52) U.S. Cl. .............................................. 713/1; 713/2
(58) Field of Classification Search ............ 713/1, 713/2

See application file for complete search history.

(56) References Cited

U.S. PATENT DOCUMENTS

| | | | |
|---|---|---|---|
| 5,859,911 A | 1/1999 | Angelo et al. | |
| 5,938,765 A | 8/1999 | Dove et al. | |
| 6,009,524 A | 12/1999 | Olarig et al. | |
| 6,018,806 A | 1/2000 | Cortopassi et al. | |
| 6,295,584 B1 | 9/2001 | DeSota et al. | |
| 6,317,879 B1 * | 11/2001 | Jacobson et al. | 717/127 |
| 6,678,741 B1 * | 1/2004 | Northcutt et al. | 709/248 |
| 2003/0005200 A1 * | 1/2003 | Kumar et al. | 710/302 |

OTHER PUBLICATIONS

U.S. Appl. No. 09/658,981, Wu et al.

* cited by examiner

Primary Examiner—Rehana Perveen
Assistant Examiner—Stefan Stoynov
(74) Attorney, Agent, or Firm—Baker Botts L.L.P.

(57) ABSTRACT

A system and method for updating or synchronizing BIOS information for a multiple-node computer system is disclosed. Each node contains at least one processor, and a BIOS is associated with each processor. The BIOS in a node may be synchronized with the BIOS of another node such that BIOS coherence may be maintained between two or more nodes in the system. The computer system may be configured as an aggregated or partitioned system.

22 Claims, 6 Drawing Sheets

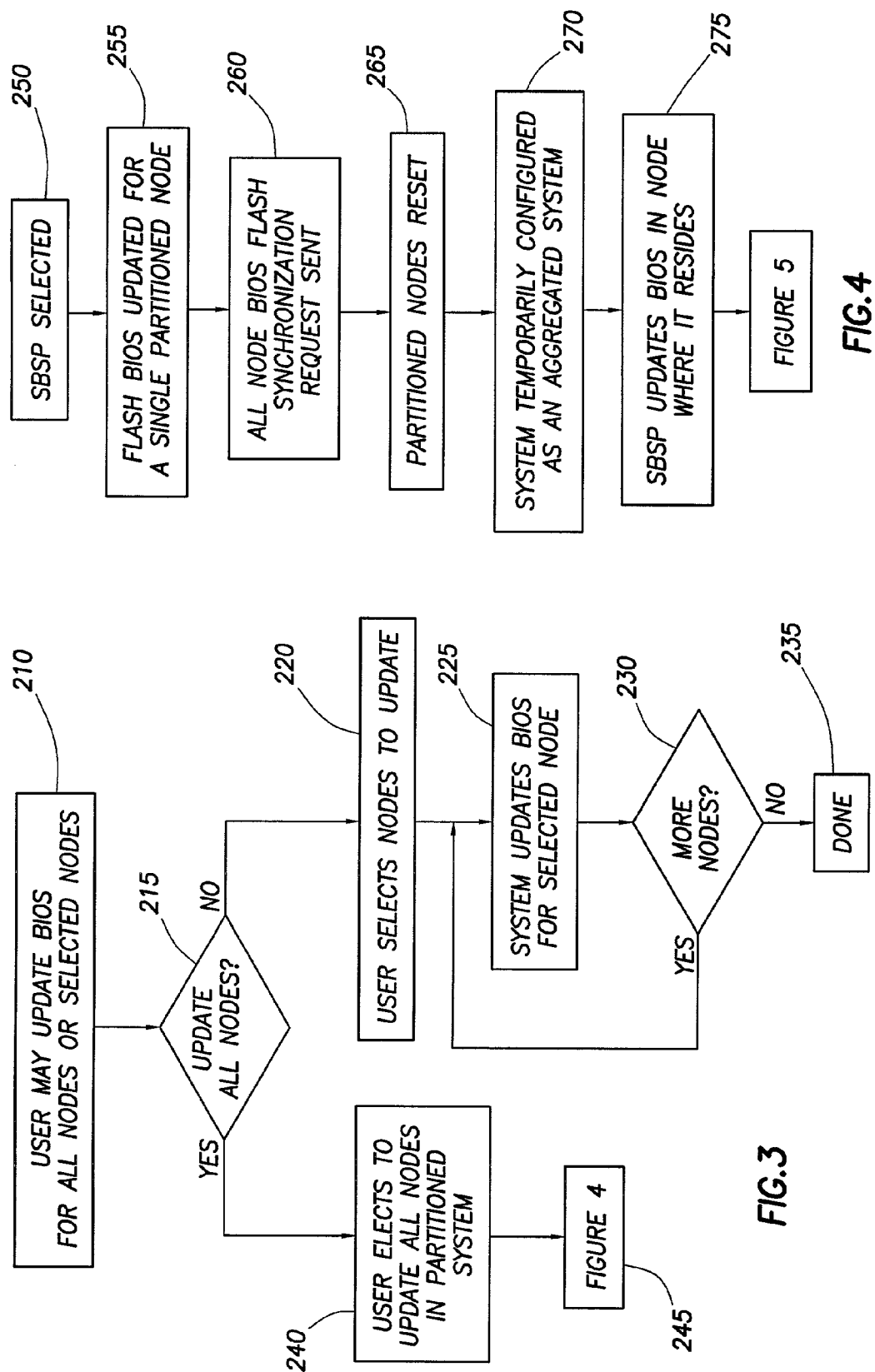

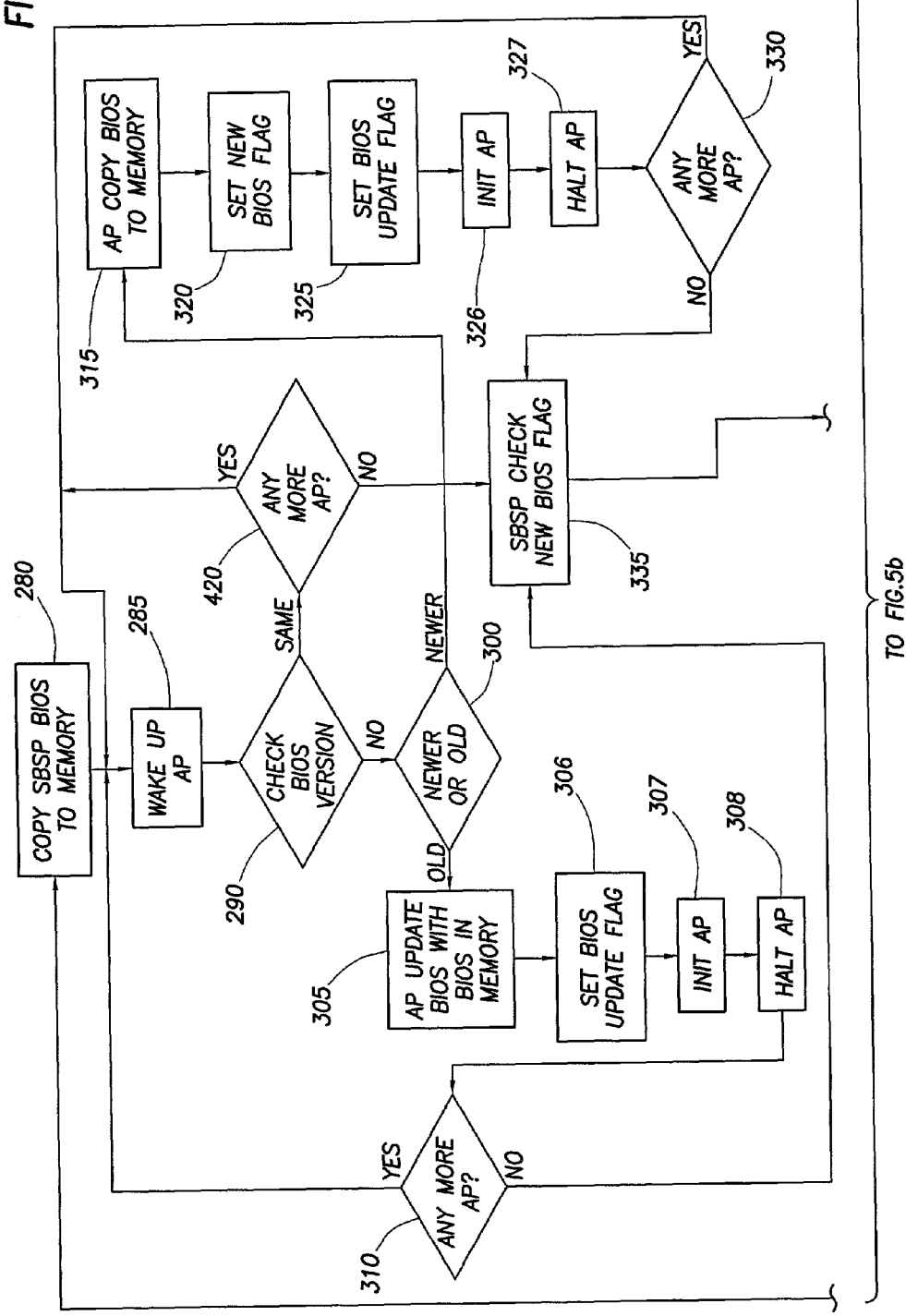

SYSTEM AND METHOD FOR UPDATING BIOS FOR A MULTIPLE-NODE COMPUTER SYSTEM

TECHNICAL FIELD

The present disclosure relates in general to the field of computer systems, and, more particularly, to a system and method for updating BIOS information.

BACKGROUND

The basic input/output system (BIOS) is the lowest level software in a computer system and acts as an interface between the hardware, e.g. the chip set and processor, and the operating system. The BIOS provides access to the system hardware and enables the creation of the higher-level operating systems (e.g., DOS, Windows) that are used to run software applications. The BIOS is also responsible for allowing control of the computer system's hardware settings, for booting up the machine, and various other system functions. For example, the BIOS may contain all the code required to control the keyboard, display screen, disk drives, serial communications, and a number of miscellaneous functions.

Computer systems may have a flash BIOS, which means that the BIOS has been recorded on a flash memory chip. Flash memory is a special type of EEPROM that can be erased and reprogrammed in blocks instead of one byte at a time. The flash BIOS can be updated if necessary. Computer systems may utilize chip sets that support multiple flash BIOSs. For example, the 870 chip set manufactured by Intel Corporation of Santa Clara, Calif., may have up to four flash BIOSs. These chip sets may be scalable and, accordingly, the computer system may be partitioned into two or more nodes. In a partitioned system, the process of updating the flash BIOS is similar to that of a traditional monolithic computer system that utilizes only one flash BIOS. However, in an aggregated system, e.g., a computer system with more than one node, the flash BIOS update process is different from that of the traditional monolithic computer system. For example, for a particular node, the flash BIOS may only be accessed from the processor(s) in that node. Furthermore, the flash BIOSs in the partitioned (two or more node) system need to be updated separately. As a result, the flash BIOSs in the nodes may contain different versions of the BIOS.

SUMMARY

In accordance with the teachings of the present invention, a system and method for updating or synchronizing BIOS information for a multiple-node computer system is disclosed that substantially eliminates or reduces the disadvantages and problems associated with prior techniques.

According to one exemplary embodiment of the present invention, a method and apparatus for updating or synchronizing BIOS information for a multiple-node computer system is disclosed, that allows a user to update the BIOS for an aggregated system. In another exemplary embodiment, the user may update the BIOS for a multiple-node computer system that is configured as a partitioned system.

An important technical advantage of the present invention is that BIOS coherency may be maintained for a multiple-node computer system whether it is configured as an aggregated system or a partitioned system. Another important technical advantage of the present invention is that BIOS coherence may be maintained for a multiple-node system regardless of the number of nodes, BIOS or processors in the system.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 is a flow diagram illustrating one exemplary embodiment for updating BIOS for a multi-node partitioned system;

FIG. 4 is a flow diagram illustrating an embodiment for updating the BIOS for all nodes in a multi-node partitioned system; and FIGS. 5a and 5b are flow diagrams illustrating an embodiment for updating BIOS for all nodes in a multi-node partitioned system.

DETAILED DESCRIPTION

Figure 1:
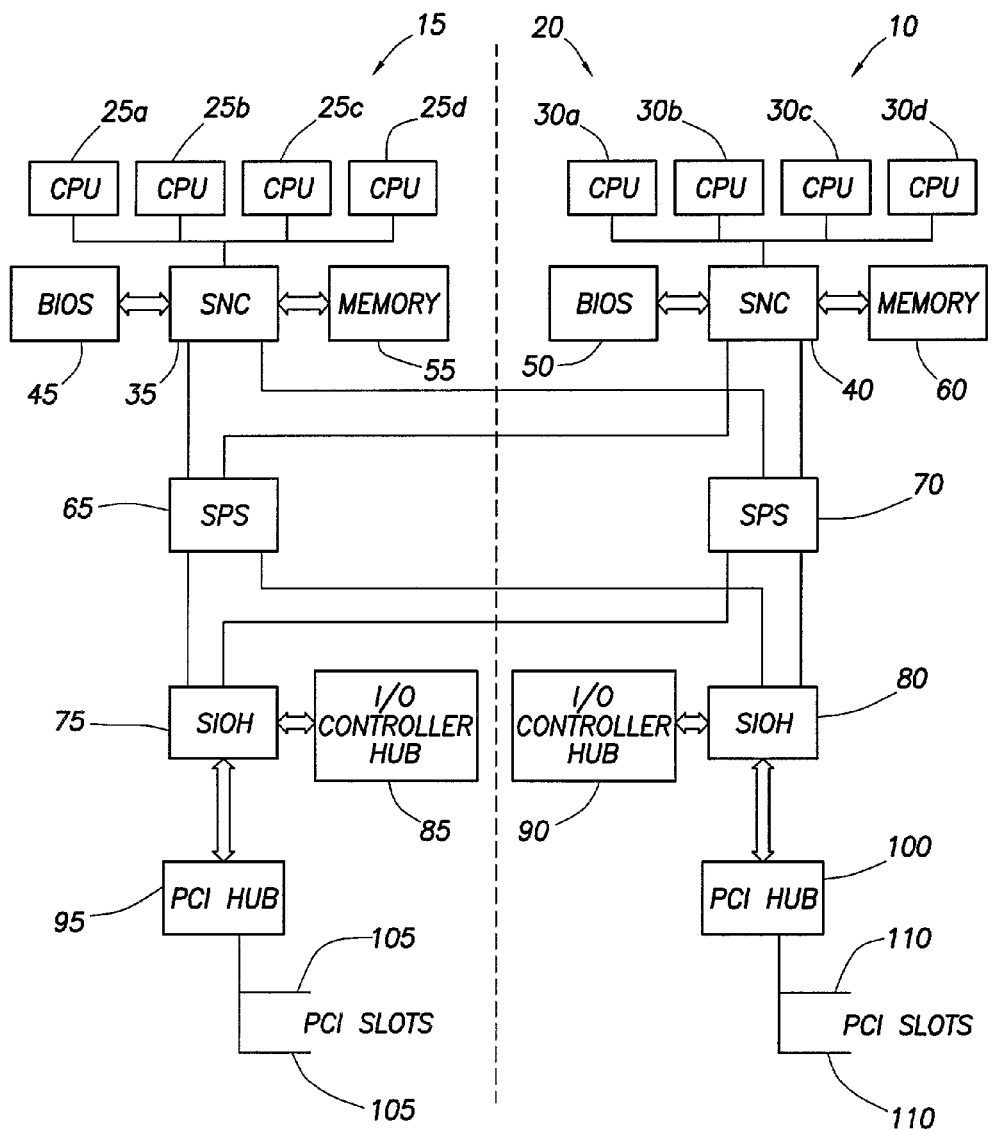
FIG. 1 is a block diagram of one exemplary embodiment of a chip set that may be operated as a partitioned system or an aggregated system.

A computer system may be partitioned into two or more nodes to create a multiple-node system. FIG. 1 depicts an exemplary embodiment of a non-monolithic computer system, indicated at 10. Computer system 10 may be aggregated into one system, or it may be partitioned into two or more nodes. For example, as depicted in FIG. 1, computer system 10 may be partitioned into two nodes, indicated at 15 and 20. As discussed above, multiple node computer systems may be implemented by using chip sets that allow a computer system to be partitioned into two or more nodes. Alternatively, a multiple-node computer system may be implemented as a virtual multiple processor system or similar distributed processor system, wherein the nodes are coupled across a computer network such as a wide are network (WAN), local area network (LAN), or similar network. For example, computer system 10 may be a virtual multiple node system, wherein nodes 15 and 20 are connected across a computer network via Ethernet, InfiniBand, or a similar network protocol.

Both nodes 15 and 20 may comprise similar components. In the exemplary embodiment shown in FIG. 1, both nodes 15 and 20 comprise one or more CPUs or processors 25 and 30, respectively. The processors for each node are coupled to a scalability node controller (SNC), shown as 35 and 40 for nodes 15 and 20, respectively. The SNC may serve as a memory controller and a host bridge. For example, the role of an SNC may be similar to that of a north bridge. One exemplary embodiment of the SNC is the Intel 870 chip set. SNC 35 is connected to BIOS 45 and memory 55. Similarly, SNC 40 is connected to BIOS 50 and Memory 60. BIOSs 45 and 50 are any suitable storage components or devices that store BIOS information. For example, BIOSs 45 and 50 may be flash BIOS devices. Memory 55 and 60 are any components or devices suitable for storing data. For example, memory 55 and 66 may be RAM or a similar type of memory device.

Nodes 15 and 20 may also comprise a scalability port switches (SPS) 65 and 70, respectively. SPS 65 and 70 may be configured to a first and second state. The SNC is operable to provide a connection with the SPS of another node. Accordingly, each SNC 35 and 40 is coupled to each SPS 65 and 70. Nodes 15 and 20, each comprise a server I/O hub (SIOH) 75 and 80, respectively. Each SIOH 75 and 80 is coupled to each SPS 65 and 70. Each SIOH 75 and 80 is coupled to a PCI hub 95 and 100, respectively. PCI hub 95 and 100 is connected to one or more PCI slots 105 and 110. PCI slots 105 and 110 enable computer devices to be connected to computer system 10. SNC 35 and 40 may operate to change the states of SPS 65 and 70. If SPS 65 and 70 are switched to a first state, computer system 10 may be operated as an aggregated system, similar to a monolithic system. If SPS 65 and 70 are switched to a second state, computer system 10 may be operated as a partitioned system.

As discussed above, with respect to each node in the partitioned system, the BIOS update process is the same as the traditional monolithic system. However, in the multiple node aggregated system, the BIOS update process is different from the monolithic system. One consideration is that the BIOS may only be accessed by the processor(s) within the same node. For example, referring to FIG. 1 for illustrative purposes, only processors 25 may access BIOS 45. Processors 30 cannot access BIOS 45. Another consideration is that the BIOSs in the separate nodes must be updated separately. Therefore, the BIOSs must be updated in a manner that maintains BIOS coherence.

Figure 2A:
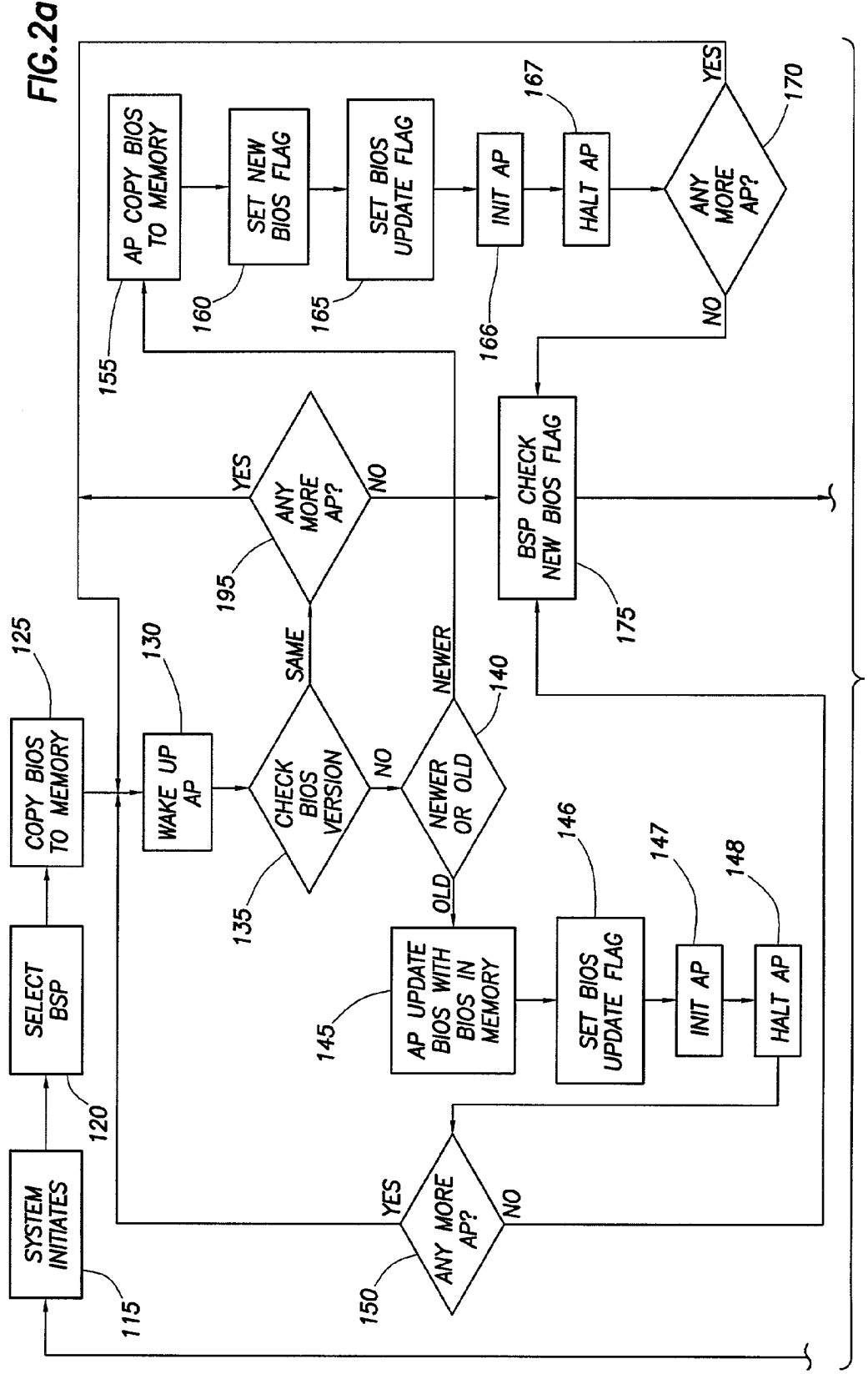
FIGS. 2a and 2b are flow diagrams illustrating one exemplary embodiment for updating BIOS for a multi-node aggregated system or a single node in a partitioned system.
Figure 2B:
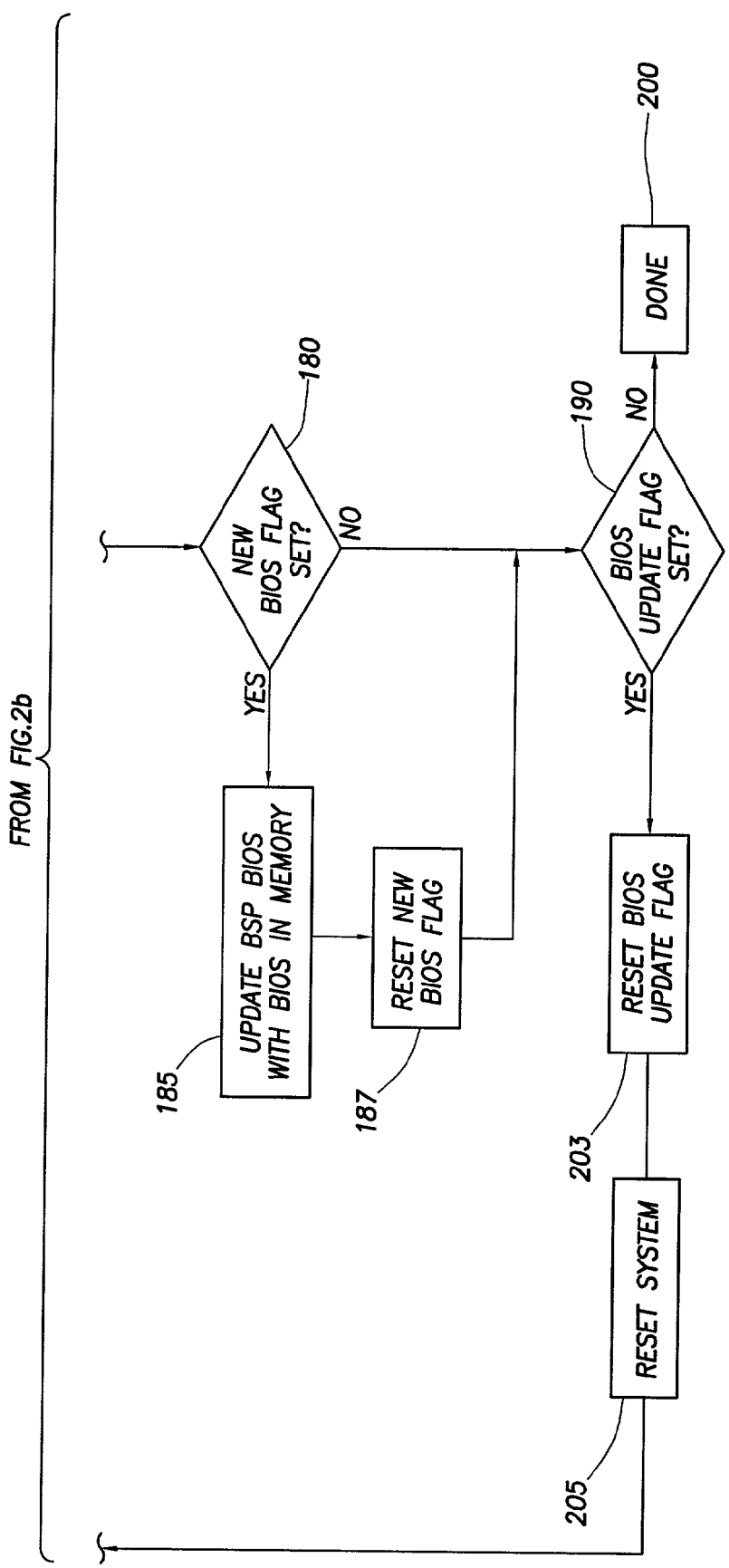

FIGS. 2a and 2b show an exemplary embodiment of a method for maintaining BIOS coherence in an aggregated multiple node system. As discussed above, for an aggregated system, the multiple nodes are treated logically as a single system. For example, referring to FIG. 1, if system 10 were configured as an aggregated system, then nodes 15 and 20 would be logically treated as a single system. The BIOS update method shown in FIGS. 2a and 2b may be implemented with an application or utility program. At step 115 of FIG. 2a the system 10 initializes. The power-on self test (POST) process begins and the system 10 starts to conduct a series of diagnostic tests. Early in the POST process, the BIOSs located in the nodes will designate a processor to serve as the system bootstrap processor (SBSP) at step 120. For example, BIOS may designate processor 25a as the SBSP. The SBSP serves as the primary booting processor. All other processors in the system 10 are halted as application processors (APs). An AP is any processor other than the SBSP. Continuing the above example, because processor 25a was selected as the SBSP, processors 25b–25d and 30a–30d would be designated as APs. Before the AP initialization begins, at step 125, an image of the BIOS associated with the SBSP, including the extended system configuration date (ESCD) area, is copied to a memory location, such as, for example, a RAM memory location. The ESCD is the area of the BIOS memory that contains BIOS settings. Using the above example, BIOS 45, the BIOS associated with SBSP 25a, would be copied to memory 55 at step 125.

At step 130, the AP wake-up process begins. For the first AP, the SBSP BIOS image that is stored in memory is compared to that of the BIOS associated with the AP at step 135. If the two versions are different, then one version of BIOS must be replaced with the other in order to maintain BIOS coherence. Accordingly, if it is determined that the two versions are different at step 135, then the BIOS update process continues to step 140. At step 140, it is determined whether the BIOS stored in memory is newer or older than the flash BIOS. If the flash BIOS is older than the BIOS stored in memory, then at step 145, the AP updates its BIOS with the BIOS stored in memory. Next, a BIOS update flag is set at step 146. The purpose of this flag is to indicate that the system must be reset to copy the new BIOS to the BIOS associated with the APs. For example, the BIOS for an AP may have been updated with an older version of BIOS before the BIOS associated with the SBSP was itself updated. Once the flag has been set, the first AP is initialized at step 147 and halted at step 148. It is determined at step 150 whether or not there are any additional APs in the system. If there are additional APs, then the update process is continued from step 130, as discussed above. If there are no more APs, then the BIOS update method proceeds to step 175, which is discussed below.

If it is determined at step 140 that the BIOS is newer that the BIOS stored in memory, then the BIOS stored in memory must be updated. At step 155, the AP copies its BIOS to memory. Next at step 160, a new BIOS flag is set in CMOS or in a memory location, such as RAM, for example. The purpose of this flag is to indicate that the latest BIOS is present in memory, e.g. an AP has a more current version of BIOS, and as a result, the BIOS associated with the SBSP must be updated. Next, a BIOS update flag is set at step 165. Once the flags have been set, the AP is initialized at step 166. Next, the AP is halted at step 167. It is then determined at step 170 whether there are other APs that must be updated. If there are more APs, then the AP initialization process continues at step 130. If there are no more APs, then the BIOS update process continues to step 175, which is discussed below.

At step 135 if it is determined that the two BIOS versions are the same, then no action is taken. The two versions may be the same if the SBSP and the AP are located in the same node. For example, the BIOS associated with SBSP 25a may be the same as those of APs 25b–25d, because these processors are located in the same node 15. If it is determined at step 195 that there are more APs in the system, then the wake-up process for the next AP begins at step 130. If it is determined that all of the APs have been initialized, then the BIOS update process proceeds to step 175.

At step 175, the SBSP checks the new BIOS flag and determines at step 180 of FIG. 2b whether or not the flag has been set. If the flag has not been set, then this indicates that the BIOS associated with the SBSP is the most current version of BIOS for the system. Next, at step 190, the SBSP checks to see if the BIOS update flag has been set. If this flag has not been set, then this indicates that the BIOSs associated with the APs are also updated. Because the BIOS associated with the APs have all been synchronized, the BIOS has been synchronized for the entire system and the BIOS update process is complete at step 200.

If the new BIOS flag has been set, then this indicates that the BIOS associated with the SBSP is not the most current version of BIOS. Accordingly, at step 185, the SBSP updates its BIOS with the BIOS copy stored in memory, which is the current version of BIOS. Next, at step 187, the new BIOS flag is reset. The SBSP then determines whether the BIOS update flag has been set at step 190. If this flag has not been set, then the BIOS associated with the SBSP and the APs have all been synchronized and the BIOS update process is complete at step 200. The BIOS flash in the SBSP node may be updated in a manner similar to that of a traditional monolithic system. The application or utility program responsible for the above BIOS synchronization process may be simplified by taking advantage of this shortcut.

However, if it is determined at step 190 that the BIOS update flag is set, then this indicates that the BIOS for the APs have not all been updated. Accordingly, the BIOS update flag is reset at step 203 and the system is reset at step 205. The system then initiates at step 115 at FIG. 2a. The BIOS update process is then repeated so that the BIOSs associated with the APs may be updated with the most current version of the BIOS.

As discussed above, the system may be partitioned into multiple nodes. For example, as shown in FIG. 1, system 10 may be partitioned into two nodes 15 and 20. FIGS. 3, 4 and 5a show an exemplary embodiment of a method for updating BIOS in a partitioned system. In a partitioned system, the nodes are logically distinct. The BIOS associated with one partition may be updated separately from another partition. A user may therefore wish to update all of the BIOSs in the system or may wish to update only those BIOSs associated with a selected number of nodes or partitions in the system. A user may chose to only update the BIOS in a selected partition if the user does not wish to affect another partition. For example, it may not be possible to shutdown one of the other partitions at the time.

Accordingly at step 210 of FIG. 3, the user is presented with the option to update the BIOS for all the nodes in the system or only selected nodes. At step 215 it is determined whether the user selects to update all nodes or only a selected number of nodes. If the user does not wish to update the BIOS throughout the system, then the user selects a partitioned node or nodes for which the user wishes to update the BIOS at step 220. At step 225, the system updates the BIOS for the selected node. As discussed above, a partitioned node is logically similar to an aggregated system with respect to the BIOS update process. Accordingly, the exemplary embodiment of the BIOS update process shown in FIG. 2a and 2b may also describe the BIOS update process for a single node of a partitioned system. For example, instead of updating all of the APs in the entire system, the BIOS is updated for only those processors within a selected partitioned node, and not those processors located in other separate partitions. At step 230, it is determined whether there are additional nodes that have been selected to be updated. If so, then the BIOS update process repeats for the next selected partitioned node as discussed above. Otherwise, the BIOS update process for the partitioned system is concluded at step 235.

Figure 5B:
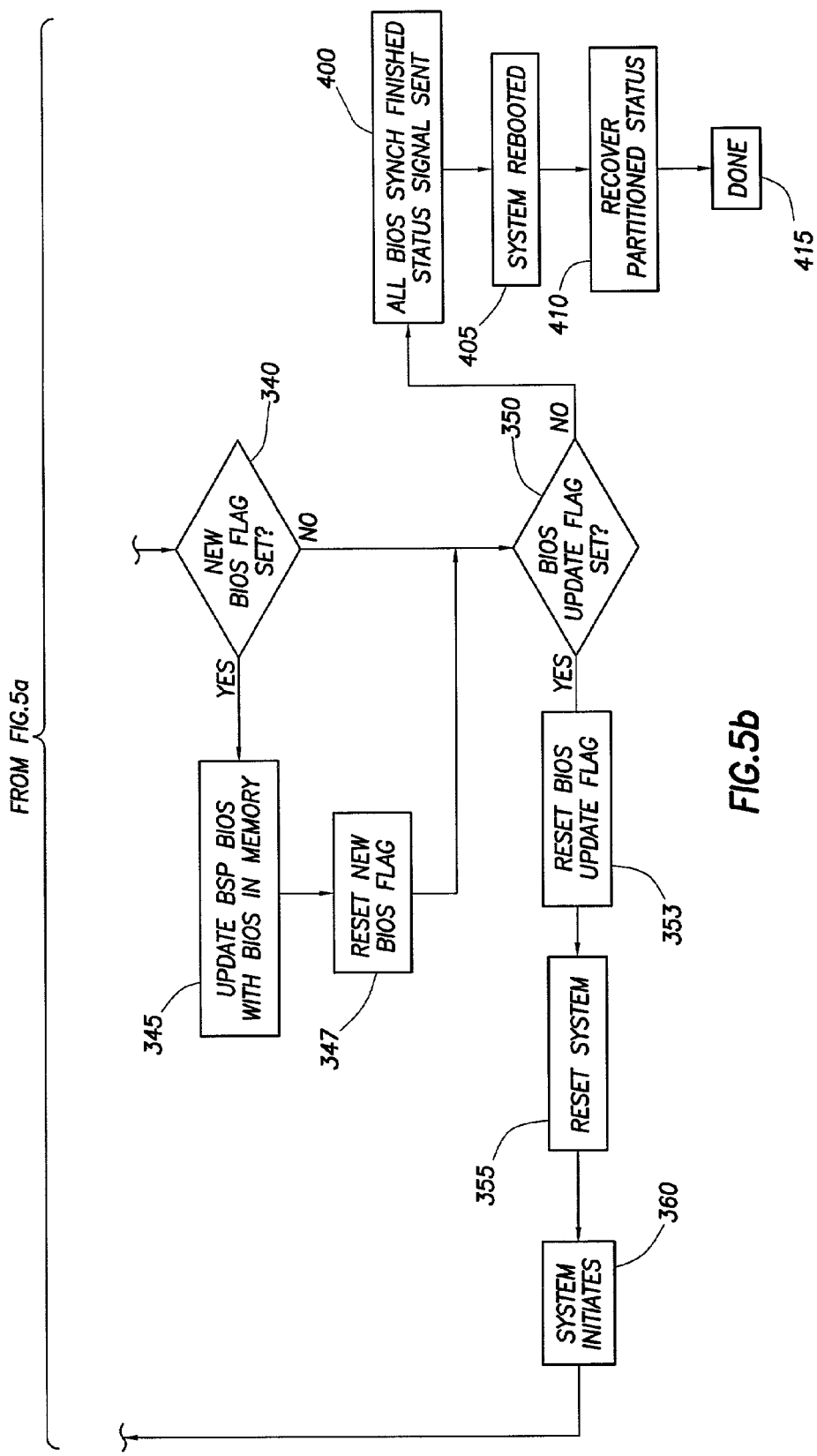

Alternatively, at step 215 of FIG. 3, the user may elect to update the BIOS for all the nodes in the partitioned system, as shown at step 240. Accordingly, the BIOS update process continues as shown in the exemplary embodiment depicted in FIGS. 4, 5a and 5b at step 245. FIGS. 4, 5a and 5b show an exemplary embodiment of updating the BIOS of all of the nodes in an partitioned system. At step 250 of FIG. 4, a SBSP is selected. At step 255, the flash BIOS is updated for only the single partitioned node associated with the SBSP. As discussed above, the process for updating the BIOS for a single partitioned node is similar to the exemplary embodiment of the BIOS update process shown in FIGS. 2a and 2b.

Once the BIOS update for this node is completed, an all node BIOS synchronization request signal is sent at step 260. The all node BIOS synchronization request may be sent to the embedded system management (ESM) subsystem or similar controller or application. In response to the all node BIOS synchronization request, the partitioned systems are all reset at step 265. Before SBSP gets control and initiates the BIOS update process, the system is temporarily configured into an aggregated system at step 270. The ESM or other suitable controller or application may perform this temporary configuration. Alternatively, the SBSP may store the system partitioning mode information in a non-volatile memory location and then temporarily configure the system into a partitioned system. Once the system has been configured into an aggregated system, the SBSP updates the BIOS for the node in which the SBSP resides at step 275. Because the system is temporarily configured as an aggregated system, the SBSP may update the BIOS in accordance with the exemplary BIOS update process shown in FIG. 2 and described above.

Once the SBSP has been updated, the SBSP BIOS is copied to a memory location, at step 280 of FIG. 5a. As discussed above, this memory location may be a predefined RAM location, for example. Next, an AP from a different node from the node containing the SBSP is initialized at step 285. The AP compares its BIOS version to the BIOS stored in the memory location at step 290. At step 285, the AP is initialized. The BIOS image stored in memory is compared to the BIOS associated with the AP at step 290. If the two versions are different, then at step 300, it is determined whether the BIOS stored in memory is newer or older than the AP BIOS. If the AP BIOS is older than the BIOS stored in memory, then at step 305, the AP updates its BIOS with the BIOS stored in memory. The BIOS update flag is subsequently set at step 306. Next, the AP is initialized at step 307. The AP is subsequently halted at step 308.

After the AP is halted, it is determined at step 310 whether or not there are any additional APs in the system. If there are additional APs, then the system wakes up the next AP at step 285. If there are no more APs, then the BIOS update method proceeds to step 335, which is discussed below. If, at step 290 it is determined that the two BIOS versions are the same, then the process proceeds to step 420. If it is determined at step 420 that there are more APs in the system, then the update process continues to the next AP at step 285. If it is determined that all of the APs have been initialized, then the BIOS update process proceeds to step 335.

If it is determined at step 300 that the AP BIOS is newer that the BIOS stored in memory, then the BIOS stored in memory must be updated. At step 315, the AP copies its BIOS to memory. Next, a new BIOS flag and a BIOS update flag are set at steps 320 and 325, respectively. Once the flags have been set, the AP is initialized at step 326 and then halted at step 327. At step 330, it is determined whether there are any other APs that must be checked. If it is determined at step 330 that there are more APs, then the system will proceed to wake up the next AP at step 285. If there are no more APs, then the BIOS update process continues to step 335.

At step 335, the SBSP checks the new BIOS flag and determines at step 340 of FIG. 5b whether the flag has been set. If the new BIOS flag has been set, then at step 345, the SBSP updates its BIOS with the BIOS copy stored in memory, which is the current version of BIOS. The new BIOS flag is then reset at step 347. Next, at step 350, the SBSP determines whether the BIOS update flag has been set. If this flag has not been set, then the BIOS associated with the SBSP and the APs have all been synchronized and the BIOS update process continues to step 400. However, if it is determined at step 350 that the BIOS update flag is set, then this indicates that the BIOS for the APs have not all been updated. Accordingly, the BIOS update flag is reset at step 353 and the system is reset at step 355. The system then initiates at step 360 and proceeds to step 280 of FIG. 5a. The BIOS update process is then repeated so that the BIOSs associated with the APs may be updated with the most current version of the BIOS.

If it is determined at step 340 and 350 that the neither the new BIOS flag nor the BIOS update flag has been set, then the BIOSs associated with the APs and the SBSP have been updated. Because the BIOS associated with the APs have all been synchronized, the BIOS has been synchronized for the entire system. Accordingly, at step 400, the SBSP sends an all BIOS synchronization finished status signal to the ESM or similar controller or application. In response to this status signal, the system is rebooted at step 405. The system then recovers the previous configuration and regains its partitioned status at step 410. For example, the ESM or other appropriate controller or application may receive the all BIOS synchronization finished status signal and recover the previous configuration in the next boot. Alternatively, the SBSP reads the system partitioning mode information, which was stored prior to the BIOS update, and configures the system to its original partitioned state. The BIOS update process is complete at step 415.

Although the disclosed embodiments have been described in detail, it should be understood that various changes, substitutions, and alterations can be made to the embodiments without departing from the spirit and the scope of the invention.

What is claimed is:

1. A multiple-node computer system comprising:
a plurality of nodes, wherein each node comprises;
   a processor operable to execute an operating system, and
   a BIOS component operable to store a BIOS associated with the processor, wherein the BIOS in a node may be synchronized with the BIOS of another node such that BIOS coherence may be maintained between two or more nodes, wherein each node further comprises:
   a memory device comprising a memory location operable to store data;
   a scalability node controller coupled to the BIOS and the memory device; and
   a scalable port switch, wherein each scalable port switch in the multiple-node computer system is coupled to each scalability node controller in the multiple-node computer system.

2. The multiple-node computer system of claim 1, wherein the states of the scalable port switches may be changed such that the nodes may be configured as a partitioned system such that each node is logically distinct, or an aggregated system, such that all of the nodes are logically a single system.

3. The multiple-node computer system of claim 2, wherein a first processor located within a logical system and associated with a first BIOS may be designated as a system bootstrap processor, wherein the system bootstrap processor is operable to compare the first BIOS to a second BIOS associated with a second processor located within the logical system to determine a most current version of BIOS and store the most current version of BIOS in the memory location such that all of the processors in the logical system may be associated with the most current version of BIOS; and
wherein the logical system is a single node if the multiple-node computer system is a partitioned system or the logical system includes all of the nodes in the multiple-node computer system if the multiple-node computer system is an aggregated system.

4. The multiple-node computer system of claim 3, wherein each node further comprises a server I/O hub, wherein each server I/O hub is coupled to each scalable port switch in the multiple-node computer system.

5. The multiple-node computer system of claim 4, wherein each node further comprises an I/O controller hub, wherein each I/O controller hub is coupled to a server I/O hub located within the same node as the I/O controller hub.

6. The multiple-node system of claim 3, wherein each node further comprises a PCI hub operable to couple devices to the multiple-node computer system, wherein each PCI hub is coupled to a server I/O hub located within the same node.

7. The multiple-node computer system of claim 1, further comprising a computer network, wherein a first node is coupled to a second node across the computer network.

8. The multiple-node computer system of claim 7, wherein the computer network is a wide area network (WAN).

9. A method of synchronizing a plurality of BIOS for an aggregated multiple-node computer system comprising a plurality of processors, wherein each processor is associated with a BIOS, comprising the steps of:
determining the most current version of BIOS, wherein the step of determining the most current version of BIOS further comprises the steps of:
   selecting a system bootstrap processor associated with a first BIOS, wherein the system bootstrap processor is a processor in the system;
   placing a copy of the first BIOS in a memory location; and
   comparing the first BIOS to a BIOS associated with an application processor to determine which BIOS is the most current version of BIOS, wherein the application processor is a processor in the system that has not been selected as the system bootstrap processor; and
synchronizing each BIOS with the most current version of BIOS, wherein the step of synchronizing each BIOS with the most current version of BIOS further comprises the steps of:
   updating the BIOS associated with the application processor with the copy of the first BIOS stored in memory if the first BIOS is more current than the BIOS associated with the application processor; and
   updating the BIOS associated with the system bootstrap processor with a copy of the BIOS associated with the application processor if the BIOS associated with the application processor is more current than the first BIOS.

10. The method of claim 9, wherein the step of updating the BIOS associated with the system bootstrap processor further comprises the step of:
replacing the copy of the first BIOS in the memory location with a copy of the BIOS associated with the application processor if the BIOS associated with the application processor is more current than the first BIOS;
setting a new BIOS flag if the BIOS associated with the application processor is more current than the first BIOS;
setting a BIOS update flag if the BIOS associated with the application processor is more current than the first BIOS;
updating the first BIOS with the BIOS placed in memory if the new BIOS flag is set; and
resetting the system if the BIOS update flag is set.

11. A method of synchronizing a plurality of BIOS for a node of a partitioned multiple-node computer system, wherein the node comprises a plurality of processors, wherein each processor is associated with a BIOS, comprising the steps of:

determining the most current version of BIOS, wherein the step of determining the most current version of BIOS further comprises the steps of:

selecting a system bootstrap processor associated with a first BIOS, wherein the system bootstrap processor is a processor in the system;

placing a copy of the first BIOS in a memory location; and comparing the first BIOS to a BIOS associated with an application processor to determine which BIOS is the most current version of BIOS, wherein the application processor is a processor in the system that has not been selected as the system bootstrap processor; and synchronizing each BIOS with the most current version of BIOS, wherein the step of synchronizing each BIOS with the most current version of BIOS further comprises the steps of:

updating the BIOS associated with the application processor with the copy of the first BIOS stored in memory if the first BIOS is more current than the BIOS associated with the application processor; and updating the BIOS associated with the system bootstrap processor with a copy of the BIOS associated with the application processor if the BIOS associated with the application processor is more current than the first BIOS.

12. The method of claim 11, wherein the step of updating the BIOS associated with the system bootstrap processor further comprises the step of:

replacing the copy of the first BIOS in the memory location with a copy of the BIOS associated with the application processor if the BIOS associated with the application processor is more current than the first BIOS;

setting a new BIOS flag if the BIOS associated with the application processor is more current than the first BIOS;

setting a BIOS update flag if the BIOS associated with the application processor is more current than the first BIOS;

updating the first BIOS with the BIOS placed in memory if the new BIOS flag is set; and resetting the system if the BIOS update flag is set.

13. A method of synchronizing a plurality of BIOS for a partitioned multiple-node computer system, wherein each node comprises a BIOS and a plurality of processors operable to execute an operating system, wherein each processor is associated with a BIOS, comprising the steps of:

updating the BIOS for a selected node, comprising the steps of:

determining the most current version of BIOS for the selected node; and synchronizing each BIOS in the selected node with the most current version of BIOS;

configuring the partitioned multiple-node computer system as an aggregated multiple-node computer system;

updating all of the nodes in the aggregated multiple-node computer system; and restoring the multiple-node computer system to a partitioned multiple-node computer system.

14. The method of claim 13 wherein the step of determining the most current version of BIOS for the selected node further comprises the steps of:

selecting a system bootstrap processor in the selected node associated with a first BIOS, wherein the system bootstrap processor is a processor in the selected node;

placing a copy of the first BIOS in a memory location; and comparing the first BIOS to a BIOS associated with an application processor in the selected node to determine which BIOS is the most current version of BIOS, wherein the application processor is a processor in the selected node that has not been selected as the system bootstrap processor in the selected node.

15. A method of synchronizing a plurality of BIOS for a partitioned multiple-node computer system, wherein each node comprises a plurality of processors and at least one BIOS, wherein each processor is associated with a BIOS, comprising the steps of:

updating the BIOS for a selected node, wherein the step of updating the BIOS for the selected node further comprises the steps of:

determining the most current version of BIOS for the selected node, wherein the step of determining the most current version of BIOS for the selected node further comprises the steps of:

selecting a system bootstrap processor in the selected node associated with a first BIOS, wherein the system bootstrap processor is a processor in the selected node;

placing a copy of the first BIOS in a memory location; and comparing the first BIOS to a BIOS associated with an application processor in the selected node to determine which BIOS is the most current version of BIOS, wherein the application processor is a processor in the selected node that has not been selected as the system bootstrap processor in the selected node; and synchronizing each BIOS in the selected node with the most current version of BIOS, wherein the step of synchronizing each BIOS in the selected node with the most current version of BIOS further comprises the steps of:

updating the BIOS associated with the application processor in the selected node with the copy of the first BIOS stored in memory if the first BIOS is more current than the BIOS associated with the application processor in the selected node; and updating the BIOS associated with the system bootstrap processor in the selected node with a copy of the BIOS associated with the application processor in the selected node if the BIOS associated with the application processor in the selected node is more current than the first BIOS;

configuring the partitioned multiple-node computer system as an aggregated multiple-node computer system;

updating all of the nodes in the aggregated multiple-node computer system; and restoring the multiple-node computer system to a partitioned multiple-node computer system.

16. The method of claim 15, wherein the step of updating the BIOS associated with the system bootstrap processor in the selected node further comprises the step of:

replacing the copy of the first BIOS in the memory location with a copy of the BIOS associated with the application processor in the selected node if the BIOS associated with the application processor in the selected node is more current than the first BIOS;

setting a new BIOS flag if the BIOS associated with the application processor in the selected node is more current than the first BIOS;

setting a BIOS update flag if the BIOS associated with the application processor in the selected node is more current than the first BIOS;

updating the first BIOS with the BIOS placed in memory if the new BIOS flag is set; and resetting the system if the BIOS update flag is set.

17. The method of claim 16, wherein the step of configuring the partitioned multiple-node computer system as an aggregated multiple-node computer system further comprises the step of:

sending an all node BIOS flash synchronization request; and configuring the partitioned multiple-node computer system as an aggregated multiple-node computer system in response to the all node BIOS flash synchronization request.

18. The method of claim 17 wherein the step of updating all of the nodes in the aggregated multiple-node computer system further comprises the steps of:

determining the most current version of BIOS for the aggregated multiple-node computer system; and synchronizing each BIOS in the aggregated multiple-node computer system with the most current version of BIOS.

19. The method of claim 17 wherein the step of determining the most current version of BIOS for the aggregated multiple-node computer system further comprises the steps of:

placing a copy of the first BIOS in a memory location; and comparing the first BIOS to a BIOS associated with an application processor in the aggregated multiple-node computer system to determine which BIOS is the most current version of BIOS, wherein the application processor is a processor in the aggregated multiple-node computer system that has not been selected as the system bootstrap processor.

20. The method of claim 19, wherein the step of synchronizing each BIOS in the aggregated multiple-node computer system with the most current version of BIOS further comprises the steps of:

updating the BIOS associated with the application processor in the aggregated multiple-node computer system with the copy of the first BIOS stored in memory if the first BIOS is more current than the BIOS associated with the application processor; and updating the BIOS associated with the system bootstrap processor in the aggregated multiple-node computer system with a copy of the BIOS associated with the application processor if the BIOS associated with the application processor in the selected node is more current than the first BIOS.

21. The method of claim 20, wherein the step of updating the BIOS associated with the system bootstrap processor in the selected node further comprises the step of:

replacing the copy of the first BIOS in the memory location with a copy of the BIOS associated with the application processor in the aggregated multiple-node computer system if the BIOS associated with the application processor is more current than the first BIOS;

setting a new BIOS flag if the BIOS associated with the application processor is more current than the first BIOS;

setting a BIOS update flag if the BIOS associated with the application processor is more current than the first BIOS;

updating the first BIOS with the BIOS placed in memory if the new BIOS flag is set; and resetting the system if the BIOS update flag is set.

22. A method of synchronizing a plurality of BIOS for a partitioned multiple-node computer system, wherein each node comprises a plurality of processors and at least one BIOS, wherein each processor is associated with a BIOS, comprising the steps of:

updating the BIOS for a selected node;

configuring the partitioned multiple-node computer system as an aggregated multiple-node computer system;

updating all of the nodes in the aggregated multiple-node computer system; and restoring the multiple-node computer system to a partitioned multiple-node computer system, wherein the step of restoring the multiple-node computer system to a partitioned multiple-node computer system further comprises the step of:

sending an all BIOS synchronization finished status signal; and restoring the multiple-node computer system to a partitioned multiple-node computer system in response to the all BIOS synchronization finished status signal.

* * * * *